(12) United States Patent
Armstrong et al.

(10) Patent No.: US 10,301,102 B2
(45) Date of Patent: May 28, 2019

(54) PLASTIC AEROSOL CONTAINER AND METHOD OF MANUFACTURE

(75) Inventors: Ralph Armstrong, Weston, CT (US); Keith J. Barker, Bedford, NH (US); Tapan Y. Patel, Nashua, NH (US)

(73) Assignee: Graham Packaging Company, LP, York, PA (US)

( * ) Notice: Subject to any disclaimer, the term of this patent is extended or adjusted under 35 U.S.C. 154(b) by 585 days.

(21) Appl. No.: 13/562,546

(22) Filed: Jul. 31, 2012

(65) Prior Publication Data

US 2013/0037580 A1    Feb. 14, 2013

Related U.S. Application Data

(60) Provisional application No. 61/513,911, filed on Aug. 1, 2011.

(51) Int. Cl.
| | |
|---|---|
| *B65D 83/38* | (2006.01) |
| *B29B 11/06* | (2006.01) |
| *B29C 49/00* | (2006.01) |
| B29C 49/06 | (2006.01) |
| B29C 49/64 | (2006.01) |

(Continued)

(52) U.S. Cl.
CPC ............... *B65D 83/38* (2013.01); *B29B 11/06* (2013.01); *B29C 49/0073* (2013.01); *B29B 2911/1402* (2013.01); *B29B 2911/14326* (2013.01); *B29B 2911/14333* (2013.01); *B29B 2911/14913* (2013.01); *B29C 49/06* (2013.01); *B29C 49/6445* (2013.01); *B29K 2067/00* (2013.01); *B29K 2077/00* (2013.01); *Y10T 428/1352* (2015.01)

(58) Field of Classification Search
CPC . Y10S 264/907–908; B29C 2049/2026; B29C 49/08; B29K 2105/253
USPC ........ 222/402.1; 428/35.7, 542.8, 36.9, 910; 264/531, 533, 534, 907–908; 73/41.2; 215/324–327, 40, 43–45, 520–521
See application file for complete search history.

(56) References Cited

U.S. PATENT DOCUMENTS 2,415,609 A * 2/1947 Sebell ............... B65D 55/0827
215/235
3,048,889 A * 8/1962 Fischer ............... B29C 49/6463
264/520

(Continued)

FOREIGN PATENT DOCUMENTS

| EP | 381322 A2 * | 8/1990 | ............. B29C 49/00 |
| EP | 1352730 A1 * | 10/2003 | ............. B29C 49/00 |

(Continued)

OTHER PUBLICATIONS

PCT International Search Report and Written Opinion of the International Searching Authority in corresponding PCT/US2012/048956 dated Jul. 31, 2012.

(Continued)

*Primary Examiner* — Paul R Durand
*Assistant Examiner* — Randall A Gruby
(74) *Attorney, Agent, or Firm* — Polsinelli, PC

(57) ABSTRACT

Plastic aerosol container having a thermally crystallized neck finish configured to receive an aerosol valve assembly and an expanded strain oriented aerosol container body integral with the neck finish. A junction between the thermally crystallized neck finish and the strain oriented container body defines a pull point at which strain orientation begins.

19 Claims, 8 Drawing Sheets

(51) Int. Cl.
B29K 67/00 (2006.01)
B29K 77/00 (2006.01)

(56) References Cited

U.S. PATENT DOCUMENTS

| | | | | |
|---|---|---|---|---|
| 3,562,372 | A * | 2/1971 | Schjeldahl | B29C 71/02 264/237 |
| 3,603,472 | A * | 9/1971 | Lecinski, Jr. | B65D 41/08 215/253 |
| 3,733,309 | A * | 5/1973 | Wyeth et al. | B29C 49/022 215/373 |
| 3,950,982 | A * | 4/1976 | Bade et al. | 73/41.2 |
| 4,231,489 | A * | 11/1980 | Malone | B65D 83/38 215/307 |
| 4,261,473 | A | 4/1981 | Yamada et al. | |
| 4,318,882 | A * | 3/1982 | Agrawal | B29C 49/6481 264/520 |
| 4,379,099 | A * | 4/1983 | Ota | B29C 49/64 215/373 |
| 4,406,854 | A * | 9/1983 | Yoshino | B29C 49/0073 215/373 |
| 4,476,084 | A * | 10/1984 | Takada | B29C 49/76 264/230 |
| 4,485,134 | A * | 11/1984 | Jacobsen | 428/36.92 |
| 4,497,855 | A * | 2/1985 | Agrawal | E04G 21/16 215/373 |
| 4,584,158 | A * | 4/1986 | Nilsson | B29C 49/12 264/529 |
| 4,589,559 | A * | 5/1986 | Hayashi | B29C 49/0073 215/42 |
| 4,618,515 | A * | 10/1986 | Collette | B29C 49/6445 215/379 |
| 4,641,758 | A * | 2/1987 | Sugiura | B65D 1/10 215/42 |
| 4,755,404 | A * | 7/1988 | Collette | B29C 49/0073 215/370 |
| 4,818,575 | A * | 4/1989 | Hirata | B29C 49/22 215/12.2 |
| 4,836,971 | A * | 6/1989 | Denis | B29C 49/649 264/342 R |
| 4,846,656 | A * | 7/1989 | Denis | B29C 49/6409 264/908 |
| 4,863,046 | A * | 9/1989 | Collette | B29C 49/0073 215/381 |
| 4,889,247 | A * | 12/1989 | Collette | B29C 49/0073 215/42 |
| 4,928,835 | A * | 5/1990 | Collette | B29C 49/6445 215/42 |
| 4,933,135 | A * | 6/1990 | Horwege | B29C 49/6409 264/235 |
| 4,991,728 | A * | 2/1991 | Hayashi | B29C 49/0073 215/42 |
| 5,004,109 | A * | 4/1991 | Bartley | B29C 49/0073 215/373 |
| 5,229,042 | A * | 7/1993 | Denis | B29C 49/16 264/230 |
| 5,261,545 | A | 11/1993 | Ota et al. | |
| 5,447,766 | A * | 9/1995 | Orimoto | B29B 11/08 215/12.1 |
| 5,520,877 | A * | 5/1996 | Collette | B29C 49/12 264/521 |
| 5,547,631 | A * | 8/1996 | Mero et al. | 264/521 |
| 5,735,420 | A * | 4/1998 | Nakamaki et al. | 215/373 |
| 5,853,829 | A * | 12/1998 | Krishnakumar et al. | 428/35.7 |
| 5,858,300 | A * | 1/1999 | Shimizu et al. | 264/521 |
| 5,888,598 | A * | 3/1999 | Brewster | B29C 49/0005 264/513 |
| 5,906,286 | A * | 5/1999 | Matsuno et al. | 215/375 |
| 6,080,353 | A * | 6/2000 | Tsuchiya | 264/458 |
| 6,217,818 | B1 * | 4/2001 | Collette | B29C 45/1625 264/255 |
| 6,237,791 | B1 * | 5/2001 | Beck et al. | 215/379 |
| 6,390,326 | B1 * | 5/2002 | Hung | 220/616 |
| 6,413,600 | B1 * | 7/2002 | Slat | 428/35.7 |
| 6,555,191 | B1 * | 4/2003 | Smith et al. | 428/36.92 |
| 6,568,156 | B2 * | 5/2003 | Silvers | B65B 61/00 53/140 |
| 6,635,325 | B1 * | 10/2003 | Hebert | 428/36.91 |
| 7,033,656 | B2 * | 4/2006 | Nahill et al. | 428/35.7 |
| 7,097,061 | B2 * | 8/2006 | Simpson, Jr. | B65D 1/0223 215/373 |
| 7,115,309 | B2 * | 10/2006 | Akiyama et al. | 428/35.7 |
| 7,303,087 | B2 * | 12/2007 | Flashinski et al. | 215/42 |
| 7,306,760 | B2 * | 12/2007 | Yamanaka et al. | 264/345 |
| 7,531,125 | B2 * | 5/2009 | Dygert et al. | 264/535 |
| 7,543,713 | B2 * | 6/2009 | Trude et al. | 215/373 |
| 7,604,769 | B2 * | 10/2009 | Lynch et al. | 264/521 |
| 7,897,222 | B2 * | 3/2011 | Witz et al. | 428/35.7 |
| 7,981,351 | B2 * | 7/2011 | Uesugi et al. | 264/346 |
| 8,394,476 | B2 * | 3/2013 | Hama et al. | 428/36.92 |
| 8,551,589 | B2 * | 10/2013 | Hutchinson et al. | 428/35.7 |
| 8,673,204 | B2 * | 3/2014 | Aoki et al. | 264/519 |
| 8,931,651 | B2 * | 1/2015 | Van Hove et al. | 215/12.1 |
| 8,962,114 | B2 * | 2/2015 | Nahill | B29B 11/14 428/35.7 |
| 8,968,636 | B2 * | 3/2015 | Eberle | 264/532 |
| 8,980,390 | B2 * | 3/2015 | Fuse et al. | 428/35.7 |
| 10,011,065 | B2 * | 7/2018 | Lane | B29C 49/0073 |
| 2001/0055657 | A1 * | 12/2001 | Slat | 428/35.7 |
| 2002/0148800 | A1 | 10/2002 | Ozawa | |
| 2002/0160136 | A1 * | 10/2002 | Wong | 428/35.7 |
| 2003/0080158 | A1 * | 5/2003 | Cull | 222/397 |
| 2003/0186006 | A1 * | 10/2003 | Schmidt et al. | 428/35.7 |
| 2003/0194518 | A1 * | 10/2003 | Nahill et al. | 428/35.7 |
| 2004/0146672 | A1 * | 7/2004 | Lynch et al. | 428/35.7 |
| 2004/0166264 | A1 * | 8/2004 | Nahill et al. | 428/35.7 |
| 2004/0222244 | A1 * | 11/2004 | Groeger | 222/402.1 |
| 2005/0003123 | A1 * | 1/2005 | Nahill et al. | 428/35.7 |
| 2005/0029712 | A1 * | 2/2005 | Nahill et al. | 264/524 |
| 2005/0127022 | A1 | 6/2005 | Flashiniski | |
| 2005/0153089 | A1 * | 7/2005 | Lynch et al. | 428/35.7 |
| 2005/0181156 | A1 * | 8/2005 | Schmidt et al. | 428/35.7 |
| 2005/0218103 | A1 * | 10/2005 | Barker et al. | 215/44 |
| 2006/0060554 | A1 * | 3/2006 | Garman | 215/43 |
| 2006/0073296 | A1 * | 4/2006 | Nahill et al. | 428/35.7 |
| 2006/0110558 | A1 * | 5/2006 | Nahill et al. | 428/35.7 |
| 2007/0059462 | A1 * | 3/2007 | Nahill et al. | 428/34.1 |
| 2007/0108668 | A1 * | 5/2007 | Hutchinson et al. | 264/521 |
| 2007/0145079 | A1 * | 6/2007 | Casamento et al. | 222/386.5 |
| 2007/0178267 | A1 * | 8/2007 | Hama et al. | 428/35.7 |
| 2007/0245538 | A1 * | 10/2007 | Salameh | 29/453 |
| 2007/0289933 | A1 * | 12/2007 | Weissmann et al. | 215/42 |
| 2008/0003387 | A1 * | 1/2008 | Altonen et al. | 428/35.2 |
| 2008/0048368 | A1 * | 2/2008 | Hirota et al. | 264/529 |
| 2008/0054526 | A1 * | 3/2008 | Barker et al. | 264/320 |
| 2008/0245761 | A1 * | 10/2008 | Piccioli et al. | 215/381 |
| 2009/0176683 | A1 * | 7/2009 | Choe et al. | 510/378 |
| 2009/0197150 | A1 * | 8/2009 | Tanaka et al. | 429/38 |
| 2009/0246428 | A1 * | 10/2009 | Shimizu et al. | 428/35.7 |
| 2011/0017701 | A1 * | 1/2011 | Soliman | 215/381 |
| 2011/0101036 | A1 * | 5/2011 | Wanbaugh et al. | 222/402.1 |
| 2011/0174765 | A1 * | 7/2011 | Patel | B65D 1/0223 215/382 |
| 2011/0174827 | A1 * | 7/2011 | Patel et al. | 220/636 |
| 2011/0180509 | A1 * | 7/2011 | Hutchinson et al. | 215/12.1 |
| 2012/0211457 | A1 * | 8/2012 | Patel et al. | 215/42 |
| 2012/0211458 | A1 * | 8/2012 | Patel et al. | 215/44 |
| 2013/0082074 | A1 * | 4/2013 | Armstrong et al. | 222/402.1 |
| 2014/0209633 | A1 * | 7/2014 | McDaniel | B29B 11/14 222/95 |
| 2015/0375887 | A1 * | 12/2015 | Van Dijck | B65D 1/0223 428/35.8 |
| 2018/0194059 | A1 * | 7/2018 | Hirayama | B29C 45/16 |

FOREIGN PATENT DOCUMENTS

JP H07156976 6/1995

(56) References Cited

FOREIGN PATENT DOCUMENTS

WO          9006889          6/1990

OTHER PUBLICATIONS

Third party observations filed with the EPO on Sep. 1, 2015 in EP 12748308.9.
Third party observations filed with the EPO on Sep. 1, 2015 in EP 12748309.9.
Office Action dated Oct. 6, 2015 in EP 12748308.9.
Rule 71(3) EPC Communication dated Jan. 20, 2017 in EP 12748308.9.

\* cited by examiner

PLASTIC AEROSOL CONTAINER AND METHOD OF MANUFACTURE

FIELD OF THE INVENTION

The present invention relates to aerosol containers and more particularly to a plastic aerosol container able to withstand the elevated pressures and temperatures of testing and storage.

BACKGROUND

Aerosol containers are subject to problems such as creep, burst, and leakage. These problems may be encountered when the containers are subjected to high temperatures and pressures during packing, testing and/or storage. For reasons of public safety, the containers must be tested to ensure compliance with regulatory guidelines directed to structural integrity. According to one test, the aerosol container is filled at 130 psig (9.14 kgf/cm$^2$ kilograms force/centimeters squared) and then heated to 131° F. (55° C.), causing the headspace pressure to rise to 140 psig (9.85 kgf/cm$^2$), or higher; the sealed container must withstand these conditions without leaking or bursting over a time period selected to mimic the conditions of actual use and storage. The pressures and thermal requirements associated with aerosol containers are much greater than for containers made for other applications, such as food and beverage containers.

SUMMARY OF THE INVENTION

The problems of creep, burst, and leakage in plastic aerosol containers are solved in accordance with one embodiment of the invention by providing a container with two specific regions that together allow the container to withstand the severe testing and use requirements. More specifically, applicant has discovered that the neck finish and its transition to the enlarged container diameter is a source of the leakage and bursting problems with plastic aerosol containers. As a result, the prior art containers are deforming in these regions, leading to a loosening of the closure and/or valve assembly. Applicant solves this problem by providing a crystallized neck finish which not only thermally stabilizes the finish but also solves the problem of stretching the preform material properly below the neck finish during the blow molding process. More specifically, crystallizing the neck finish provides a means to control a point at which orientation begins during blow molding of the plastic aerosol container.

The neck finish of a preform is thermally crystallized by heating, wherein at least the outer surface and preferably the entire thickness of the neck finish is crystallized. On the other hand, the body of the container is strain oriented during the blow molding process. Accordingly, a junction between the neck finish and the body is created. The junction between the neck finish and the body defines a pull point at which strain orientation begins. Controlling the location of the pull point by way of crystallizing the neck finish helps to provide full strain orientation under the neck finish. As a result, the invention provides one or more of the following benefits: (1) reducing the weight of the container; (2) reducing thermal distortion of the neck finish and of the area under the neck finish; and (3) reducing stress cracking of the neck finish and area under the neck finish.

In one embodiment of the invention, there is provided an aerosol container having a thermally crystallized neck finish configured to receive an aerosol valve and closure assembly, and an expanded strain oriented aerosol container body integral with the neck finish. A junction between the thermally crystallized neck finish and the strain oriented container body defines a pull point at which strain orientation begins.

In one embodiment, the container comprises at least one of polyester and polyamide.

In one embodiment of the invention, the container comprises polyethylene terephthalate (PET).

In one embodiment, the neck finish includes a flange. The valve and closure assembly includes a crimp, configured to connect the valve and closure assembly to the neck finish. In other embodiments, the closure assembly and neck finish have complementary threads (a threaded connection) and/or the closure and neck finish are secured by adhesives or the like.

In another embodiment, a method of making a plastic aerosol container is provided. The method includes creating a pull point between a neck finish of a preform of crystallizable polymer by thermally crystallizing the neck finish, and blow molding the body from the pull point to form an expanded strain oriented container body, wherein the plastic aerosol container comprises the crystallized neck finish and the strain oriented aerosol container body.

In another embodiment, a method of making a plastic aerosol container is provided. The method includes blow molding a preform to form a hollow plastic aerosol container with an expanded strain oriented aerosol container body, and thermally crystallizing a neck finish integral with the body.

In another embodiment, a preform for blow molding a plastic aerosol container is provided. The preform has a thermally crystallized neck finish configured to receive a closure and aerosol valve assembly. The preform also includes a body integral with the thermally crystallized neck finish and configured to be expanded by blow molding to form an expanded strain oriented aerosol container body. A junction between the neck finish and the body defines a pull point at which strain orientation begins.

In another embodiment of the invention, the preform is provided comprising at least one of polyester and polyamide.

In another embodiment of the invention, the preform is provided comprising polyethylene terephthalate (PET).

The neck finish may include at least one of a flange and a thread.

BRIEF DESCRIPTION OF THE DRAWINGS

The above and further advantages of the invention may be better understood by referring to the following description in conjunction with the drawings in which.

DETAILED DESCRIPTION

Figure 1:
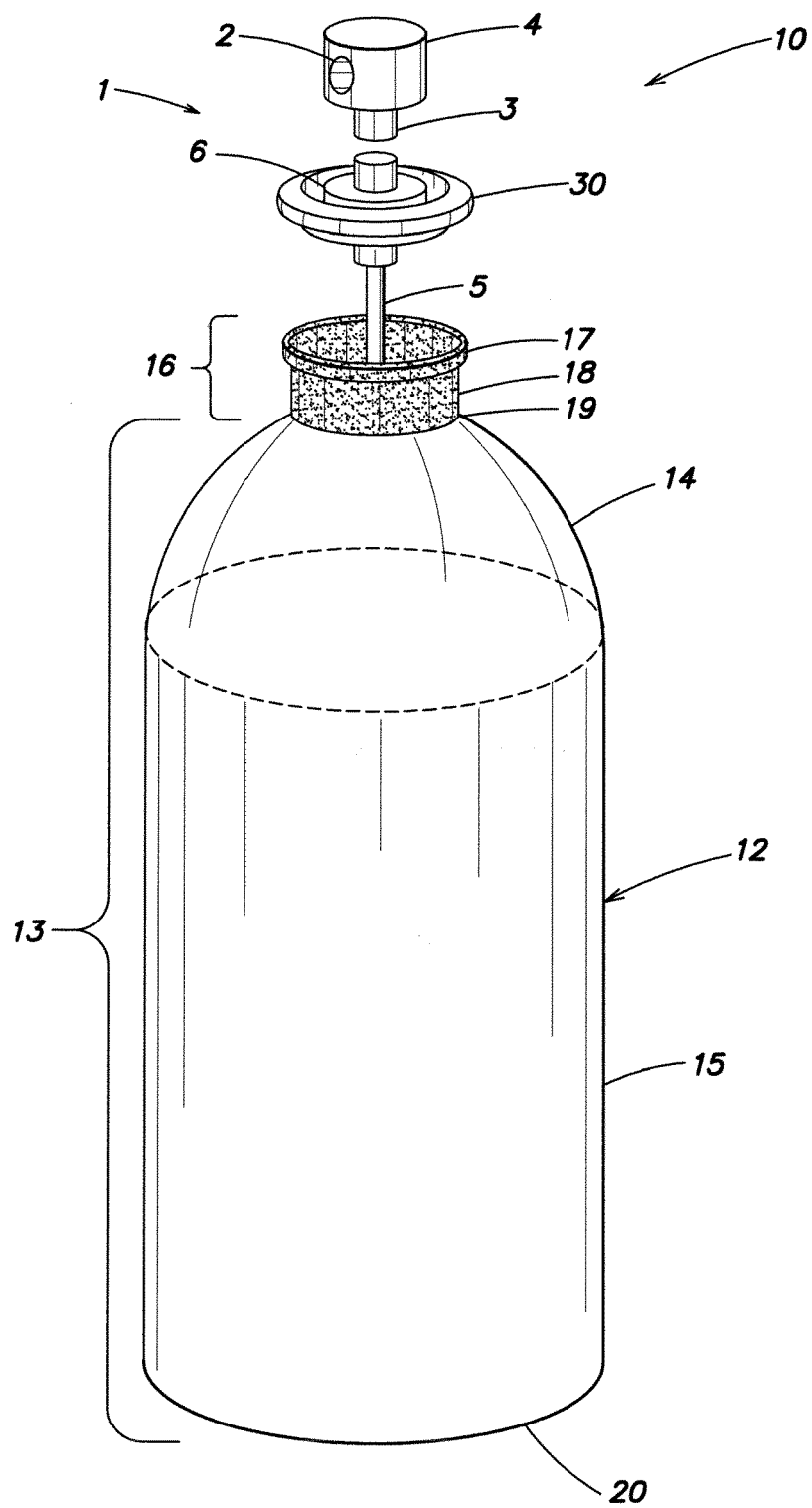
FIG. 1 is a schematic illustration of an unassembled aerosol dispenser including a plastic aerosol container having a thermally crystallized neck finish and expanded strain oriented body portion according to one embodiment of the invention.

Referring to the drawings, FIG. 1 depicts an unassembled plastic aerosol dispenser 10 for dispensing contents under pressure according to one embodiment of the invention. The dispenser 10 has three main parts; a container 12, a valve assembly 1, and a closure 30. Valve assembly 1 includes discharge orifice 2, valve stem 3, actuator 4, dip tube 5, and a pump mechanism 6, mounted on closure 30.

An aerosol propellant and an aerosol product are stored within the dispenser 10. The aerosol propellant may be any of the propellants used for aerosol dispensers including liquefied propellants such as hydrocarbons and hydrofluorocarbons and any of the compressed gases such as carbon dioxide or nitrogen. The valve assembly 1 controls the flow of the aerosol product, which is pumped via the pump mechanism 6 by means of actuator 4 from the container 12. The product enters the valve assembly via dip tube 5 and travels through valve stem 3 for discharge through the discharge orifice 2.

Container 12 includes an upper thermally crystallized portion 16 integral with a lower biaxially strain oriented portion 13.

Upper crystallized portion 16 comprises a neck finish 18 having a top sealing portion 17. Pull point 19 is a line of demarcation between upper crystallized portion 16 and lower oriented portion 13. Top sealing portion 17 is provided at the top of the neck finish 18 for connecting the valve assembly 1 to the container 12 by means of the closure 30 (closure 30 is discussed in further detail in FIG. 3). The neck finish 18 is substantially cylindrical and integral with a tapered shoulder 14, a cylindrical sidewall 15 and a bottom wall 20 of lower oriented portion 13.

Lower oriented portion 13 includes a shoulder 14, a cylindrical sidewall 15, and bottom portion 20. The top end of the shoulder 14 is integral with the neck finish 18. The tapered shoulder 14 generally increases in diameter in a downward direction and can be formed in any shape and dimension as known in the art. The smallest diameter of the shoulder 14 at the pull point 19 is equal to the diameter of the neck finish 18. The bottom end of the shoulder 14 is integral with the cylindrical sidewall 15. The sidewall 15 is shown as having a cylindrical shape; however any shape which accommodates a pressurized liquid or gas may be used. A bottom portion 20 is provided integral with the bottom end of cylindrical sidewall 15 forming a closed bottom portion of the container 12.

Figure 2:
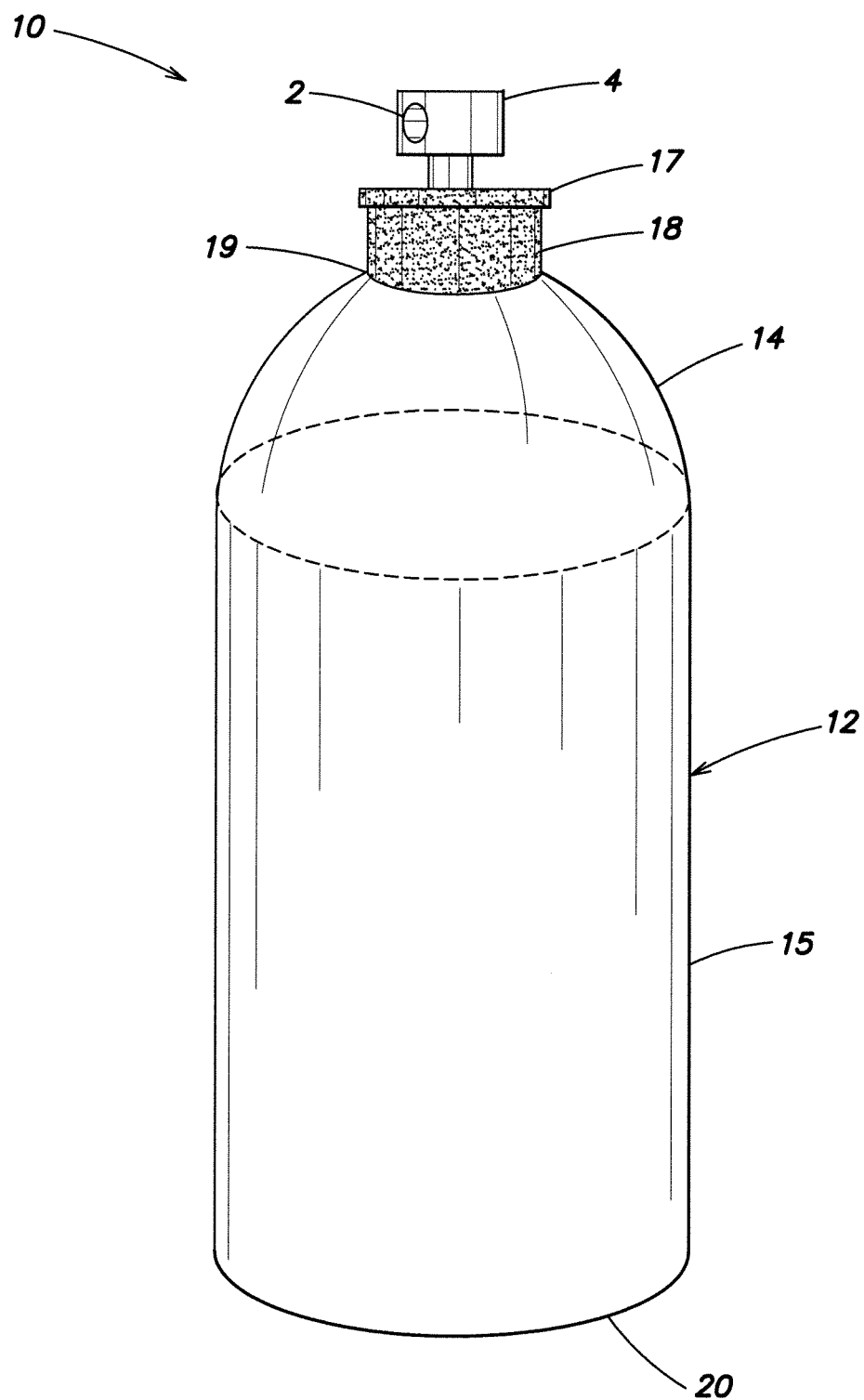
FIG. 2 is a schematic illustration of the aerosol dispenser of FIG. 1 in an assembled state.

FIG. 2 depicts the plastic aerosol dispenser 10 in the assembled state. As seen in FIG. 2, the closure 30 and valve assembly 1 is crimped to the top sealing portion 17 of the container 12. Although FIG. 2 illustrates a top sealing portion 17 having a flange, a flange is not required. Other closure structures known in the art may be used. For example, instead of being crimped, the valve assembly 1 may be fastened to the container 12 without crimping by means of an adhesive including, but not limited to, glue, and/or by a threaded connection (see FIG. 8).

The upper crystallized portion 16 is thermally crystallized (see FIG. 3 for further details regarding crystallization of the neck finish), as indicated by the cross hatching. In the present invention, the upper crystallized portion 16 has at least 5% crystallinity in order to provide thermal and mechanical stability to ensure compliance with regulatory guidelines. More preferably, the upper crystallized portion 16 is from about 20-40% crystallized. Most preferably, the upper crystallized portion 16 is about 25-35% crystallized. The percent crystallinity is determined according to American Society for Testing and Materials (ASTM) Standard D1505 as follows:

% crystallinity=$[(ds-da)\backslash(dc-da)]\times 100$ where ds=sample density in g/cm$^3$, da=density of an amorphous film of 0% crystallinity (for PET 1.333 g/c$^3$ m), and dc=density of the crystal calculated from unit cell parameters (for PET 1.455 g/cm$^3$).

Additionally, crystallizing the upper portion 16 improves the ability to achieve strain orientation of the container 12 below the upper crystallized portion 16 during the blow molding process.

Figure 3:
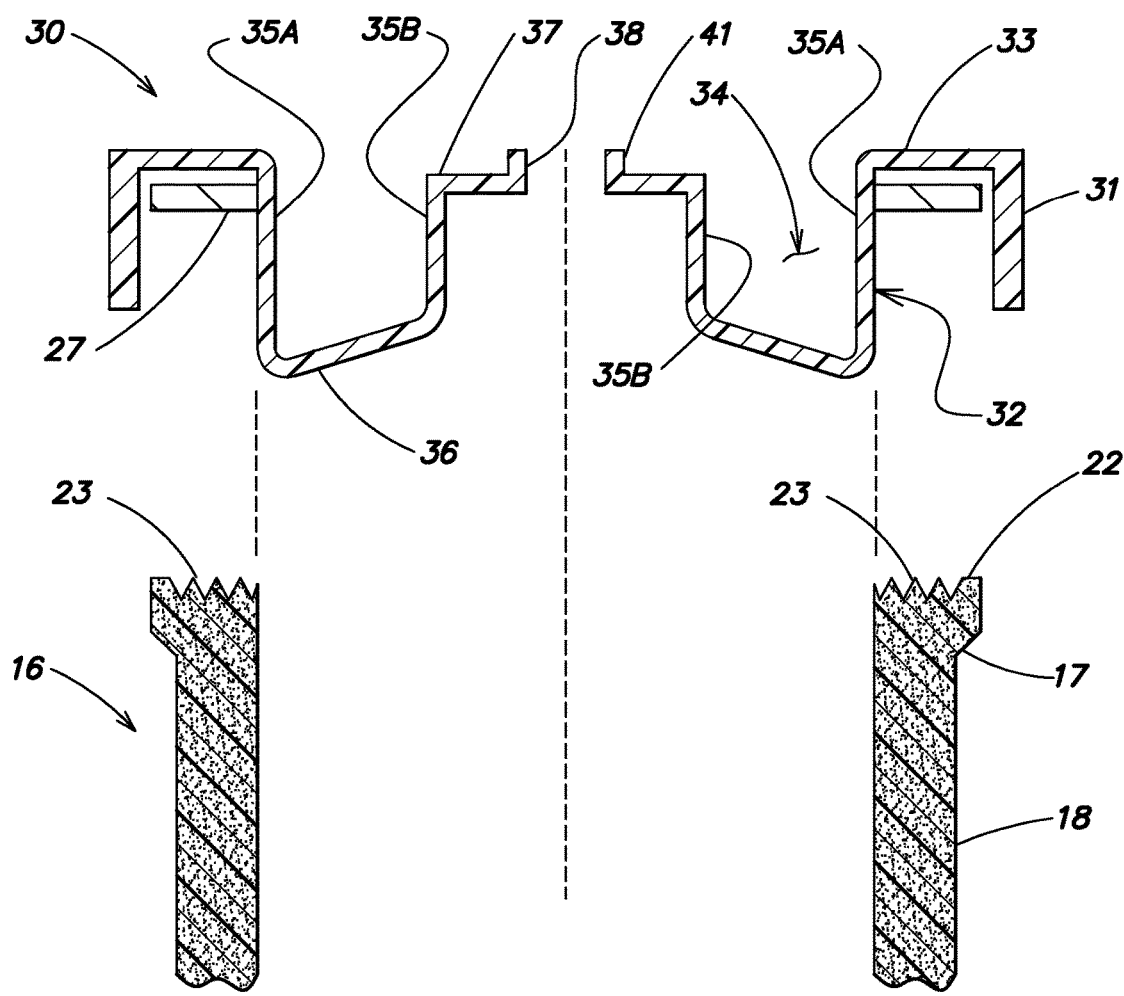
FIG. 3 is a schematic illustration of one embodiment of a crystallized neck finish and crimp closure.

FIG. 3 illustrates an expanded view of one embodiment of an upper crystallized portion 16 of container 12 and a schematic, cross sectional view of one embodiment of a closure 30. Closure 30 includes outer sealing rim wall 31, inner sealing rim wall 32, and top sealing rim wall 33, which together forma cup-shaped sealing portion for attachment to the top portion of the neck finish 18. The enclosure further includes, radially inwardly of the sealing portion, an annular depression or trough 34, including opposing trough sidewalls 35A and 35B, connected by bottom wall 36. Radially inwardly of the trough is an upwardly extending central projection 41 extending from wall 37, having a central aperture 38, for attachment to the valve assembly.

In this embodiment the upper crystallized container portion 16 has a top sealing surface 22 with serrations 23. The serrations are formed during fabrication, e.g. while injection molding the preform neck finish. The outer sealing wall 31, inner sealing wall 32, and top sealing wall 33 at the rim of closure 30 fit around the flange 17 on the top of the neck finish 18. The outer wall 31 is then deformed to wrap around the top flange 17 on the neck finish to form a hermetic seal. A resilient (e.g. rubber or similar thermoplastic materials) gasket 27 is preferably provided between the top wall 33 and serrated top surface 22 of the finish to enhance the compressive seal.

Closure 30 also connects the valve assembly to the container 12. The valve assembly fits into aperture 38 and may be attached by crimping (deforming) the closure wall 35B to engage the valve stem assembly.

Figure 4:
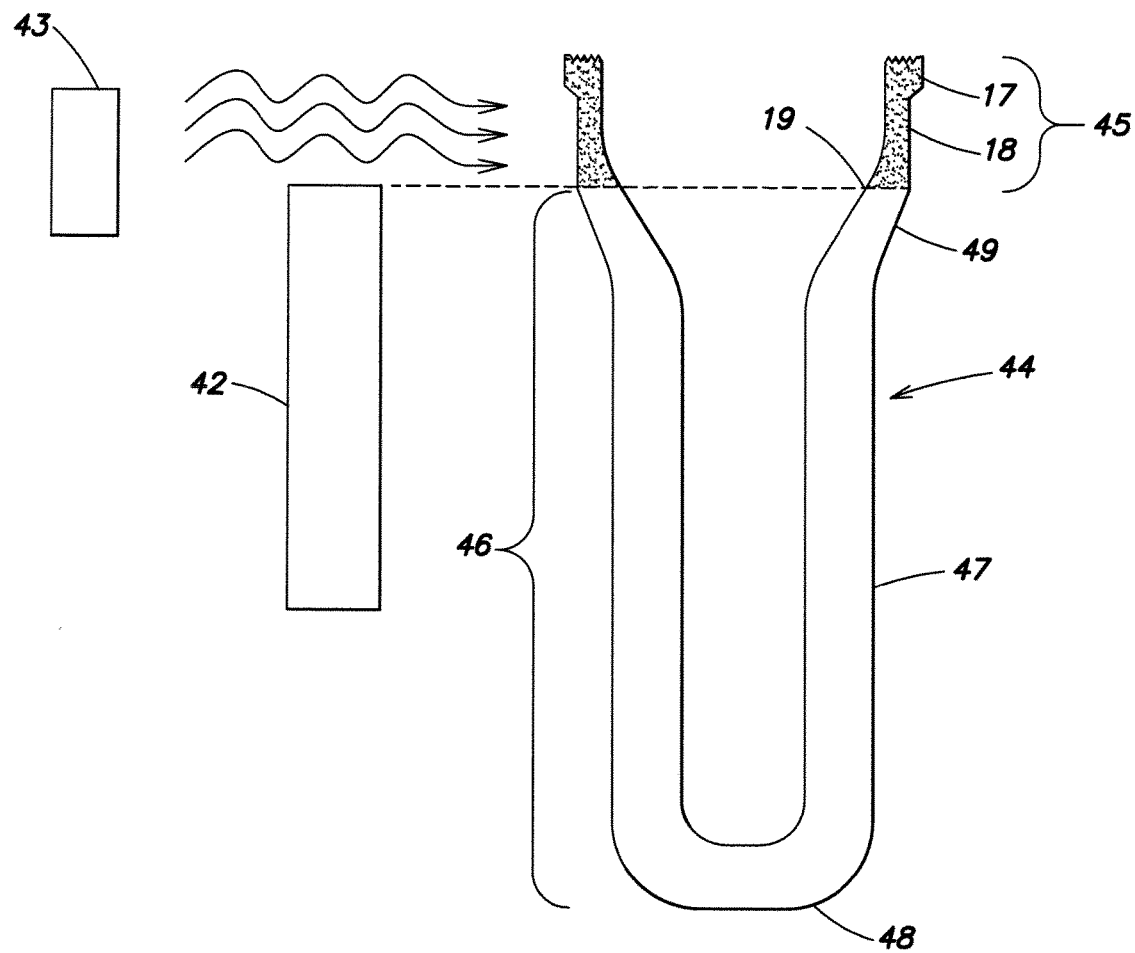
FIG. 4 is a schematic illustration of one embodiment of a method of thermally crystallizing the neck finish of a preform for making the plastic aerosol container of FIG. 1.

Preform 44 of FIG. 4 comprises an upper portion 45 and a lower portion 46. The upper portion 45 comprises neck finish 18 with top sealing portion 17, same as in the container shown in FIGS. 1-3. Lower portion 46 comprises a perform sidewall 47, a base 48, and a tapered shoulder 49. According to the present invention, the upper portion 45 of the preform 44 is thermally crystallized, while the lower portion 46 is not. The lower boundary line of crystallization of the upper portion 45 defines, at pull point 19, the initiation of stretching of the preform material below the neck finish 18 during the blow molding process.

FIG. 4 depicts one method of thermally crystallizing the upper preform portion 45 before the lower portion 46 is inflated during the blow molding process. The preform 44 is passed by a heating element 43 to thermally crystallize the neck finish 18 (which includes the top sealing portion 17). A thermal shield 42 prevents the lower portion 46 from exposure to heat, such that the lower portion 46 of the preform 44 is not thermally crystallized. As thermal crystallization will interfere with orientation due to stretching, this line of demarcation (the pull point 19) between the crystallized upper portion 45 and the uncrystallized lower portion 46 of the preform 44 is highly desirable.

The neck finish 18 may be crystallized by any of the methods known in the art. Generally, a finish portion may be thermally crystallized by placing the portion adjacent to a heating element, such as a radiant heater, at a suitable temperature and for sufficient time to crystallize the material in the area desired. In one embodiment, the heater may be positioned in a range of from about ⅜ inches (0.95 cm) to about 2 inches (5.08 cm) from the neck finish, the heater being at a temperature of from about 500° F. (260° C.) to about 1250° F. (677° C.), and the crystallizing taking about 30 to 75 seconds. Adjustments to the time and temperature can be made depending on preform materials and dimensions, including the desired depth and area of crystallization. In accordance with the present invention, it is preferred to crystallize the entire upper portion 45 of the preform 44 in order to control the point at which orientation begins during the blow molding process.

The lower portion 46 of preform 44 may be any of the known shapes of preforms in the art. Here it includes a tapered shoulder 49, a cylindrical sidewall portion 47 and a semihemispherical, closed base 48. As is made clear by FIG. 5, after the preform lower portion 46 is biaxially oriented during the blow molding process, the tapered shoulder 49 of the preform 44 corresponds with the shoulder 14 of the container 12, the body 47 of the preform 44 corresponds with the sidewall 15 of the container 12, and the base 48 of the preform 44 corresponds with the bottom 20 of the container 12.

For a typical polyester aerosol container of about 100 ml to about 1000 ml in volume, a suitable planar stretch ratio is about 8:1 to about 13:1, with a hoop stretch of about 2:1 to about 4:1 and an axial stretch of about 2:1 to about 4:1. The container sidewall is about 0.015 inches (0.038 cm) to about 0.025 inches (0.0635 cm) thick. The base may be thicker and require less orientation. Also, the orientation in the tapered shoulder will vary from that in the cylindrical sidewall due to differences in the geometry (e.g. amount of hoop stretch).

Figure 5:
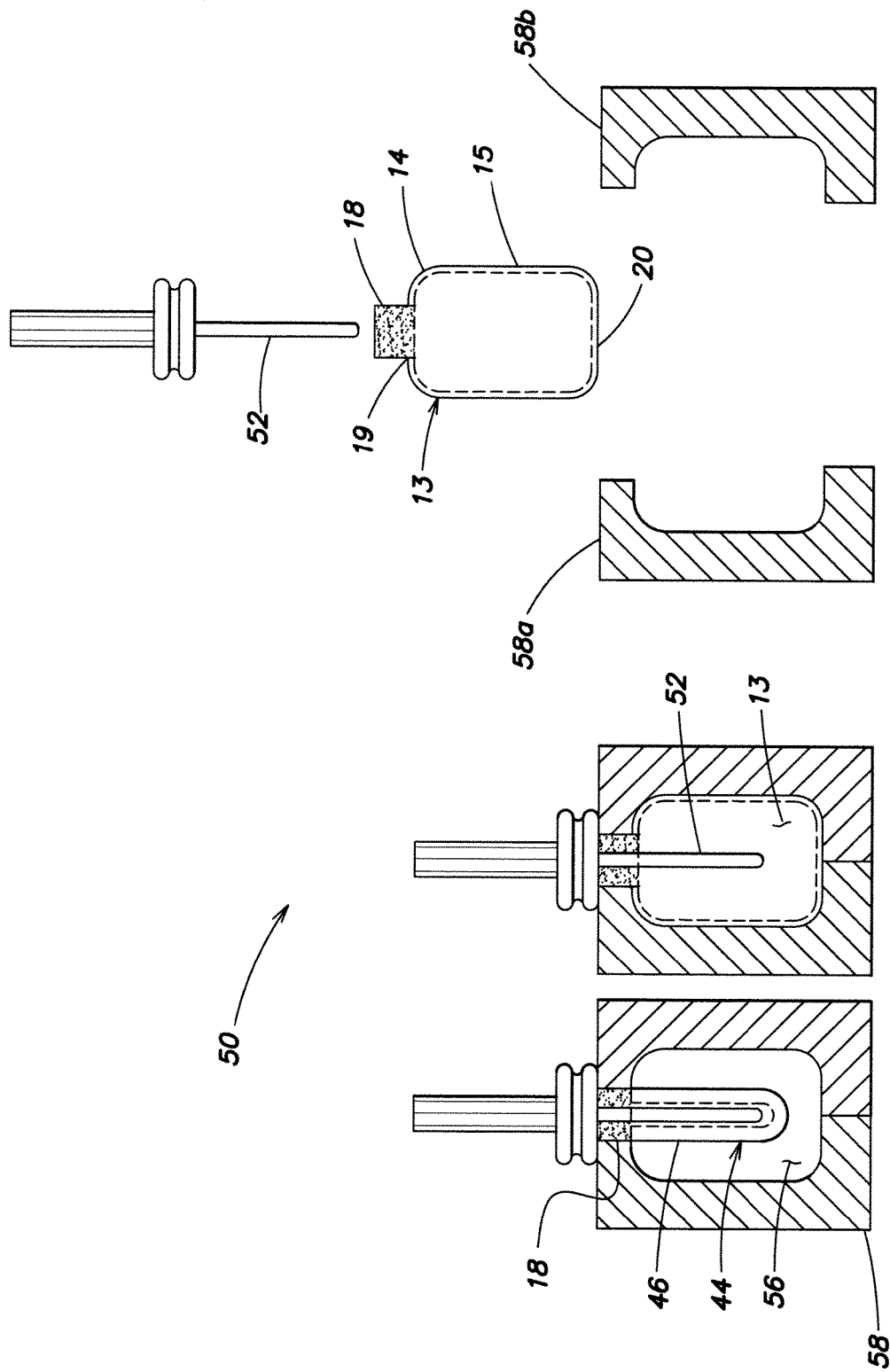
FIG. 5 is a schematic illustration of a blow molding process for making the plastic aerosol container of FIG. 1.

FIG. 5 depicts the step 50 of inflating the lower portion 46 of the preform 44 using a mold 58. As illustrated in FIG. 5, the preform 44 has a neck finish 18 including a top sealing portion 17 that has been strengthened through thermal crystallization. The preform 44 is placed inside a blow mold cavity 56. Air is injected through the core rod 52 until the lower portion 46 of the preform 44 takes the shape of the cavity, thereby creating the lower expanded portion 13 of container 12. The neck finish 18 having the top sealing portion 17 remains substantially unchanged during the process. Through this process, the polymer material is stretched from the pull point 19 defined in the previous step of thermally crystallizing the neck finish 18, resulting in strain hardening of the resin in the lower container portion. Therefore, biaxial strain orientation begins from the bottom of the neck finish 18 at the pull point 19. Accordingly, the lower container portion is strain oriented, while the neck finish 18 is thermally crystallized. When the container 12 is cooled, the mold halves 58a and 58b are opened and the container is ejected from the blow molding machine; it now comprises the container 12 seen in FIGS. 1 and 2, for example.

Although the above paragraphs describe thermally crystallizing the upper portion 45 before the container 12 is blown, the upper portion 45 can be thermally crystallized after the container 12 is blown. However, it is preferred that the upper portion 45 is thermally crystallized prior to the inflation of the container 12 in order to be able to provide the desired pull point 19 for orientation during blow molding.

In accordance with the present invention, the plastic containers must conform to a hot water bath test for leak detection under 49 CFR § 173.306(a)(3)(v) (United States Code of Federal Regulations, Chapter 1 (2010 Jan. 6 edition), U.S. Department of Transportation Rules and Regulations). The requirements of the hot water bath test under 49 CFR § 173.306(a)(3)(v) are:

(v) Each container must be subjected to a test performed in a hot water bath; the temperature of the bath and the duration of the test must be such that the internal pressure reaches that which would be reached at 55° C. (131° F.) (50° C. (122° F.) if the liquid phase does not exceed 95% of the capacity of the container at 50° C. (122° F.)). If the contents are sensitive to heat, the temperature of the bath must be set at between 20° C. (68° F.) and 30° C. (86° F.) but, in addition, one container in 2,000 must be tested at the higher temperature. No leakage or permanent deformation of a container may occur.

Figure 6:
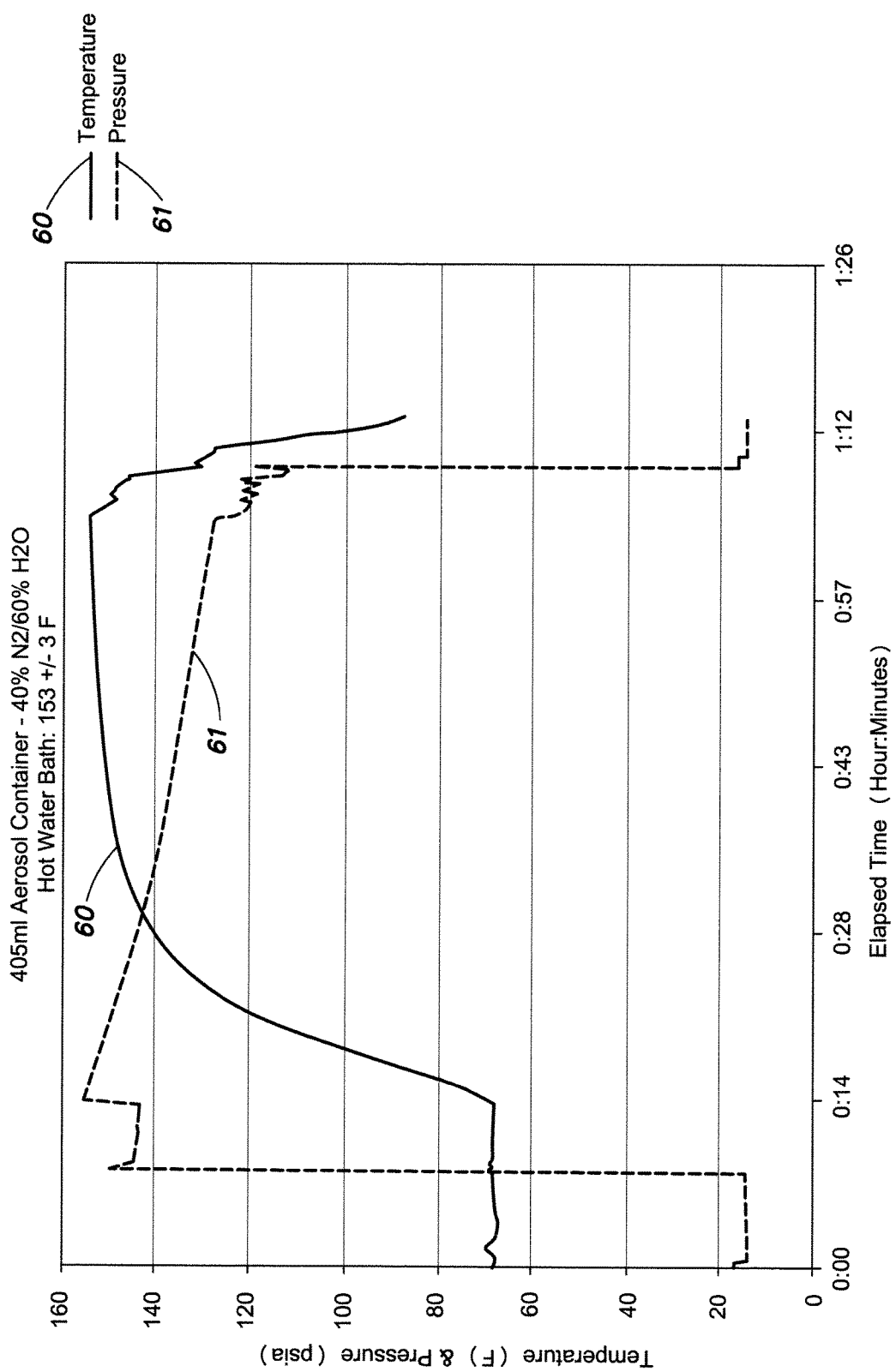
FIG. 6 is a pressure and temperature trace for a plastic aerosol container undergoing a test in a hot water bath.

FIG. 6 illustrates the temperature and pressure conditions of a test according to one embodiment. A 405 ml PET aerosol container (0.022 inch (0.0559 cm) sidewall thickness, planar stretch ratio of 11, hoop stretch of 3.3 and axial stretch of 3.3) was filled 60% (of container volume) with water and 40% nitrogen (as the propellant) pressurized to 130 psig (9.14 kgf/cm$^2$), and submerged in a hot water bath of 153° F. (67.2° C.) for 30 minutes. The dispenser 10 did not leak at the closure and showed no signs of distortion. As indicated in the graph, the dispenser 10 is able to withstand the aforementioned temperature 60 and pressure 61 requirements for a duration well beyond the time requirements established in the guidelines. In this test, the container was sealed with a closure of the type illustrated in FIG. 3, including the valve assembly; the closure unit (metal cup, rubber-like gasket and valve assembly) are sold as a unit by Summit Dispensing Systems, Inc., Manchester, N.H., USA. After removal from the hot water bath tank, the pressure was measured, having dropped to about 110-115 psig (7.74-8.09 kgf/cm$^2$) due to expansion of the container. The container is then equilibrated and placed in a stability chamber having a temperature of 50° C. and 50% relative humidity. The container may continue to be monitored for pressure for, e.g., 6 months to one year.

Figure 7A:
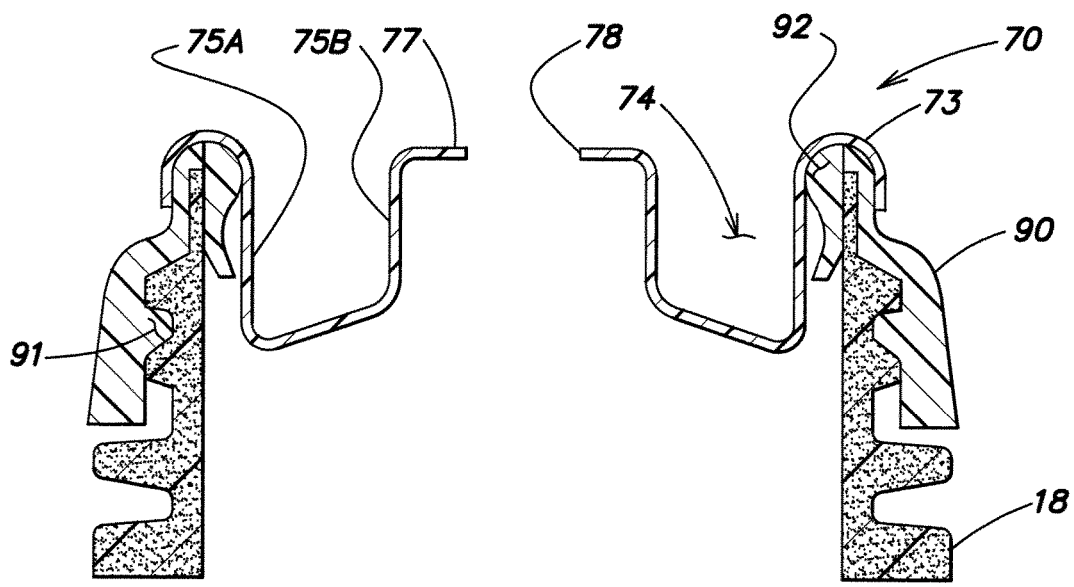
FIGS. 7A and 7B are schematic illustrations of an alternative embodiment of a threaded neck finish and closure.
Figure 7B:
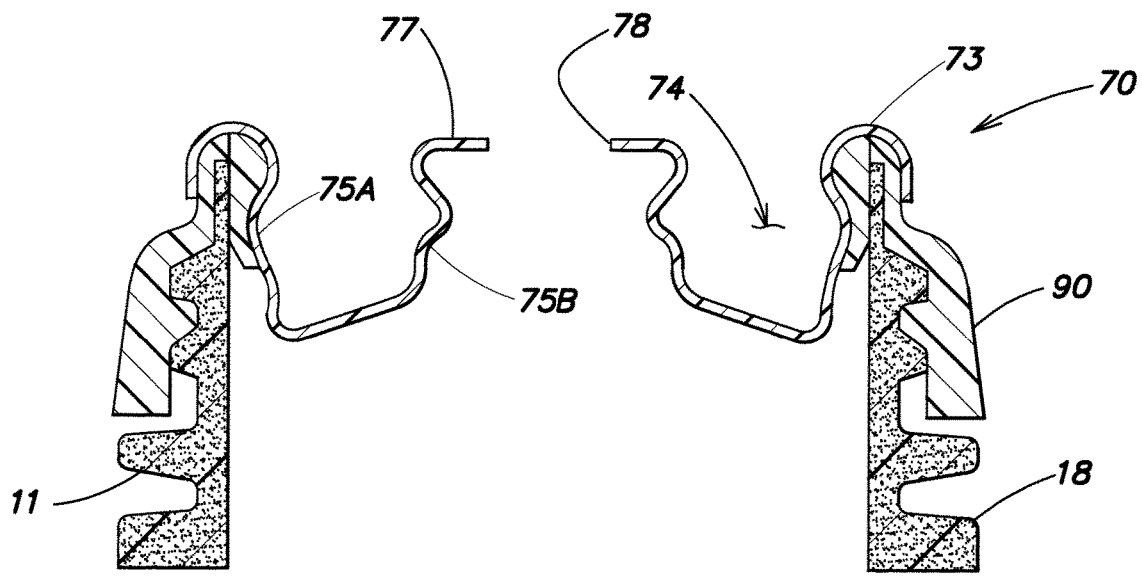

FIGS. 7A and 7B illustrate another embodiment of a container 12 and a closure 70. Here, the neck finish 18 does not have a top sealing flange. Instead, the neck finish 18 has external threads 11 and a nylon collar 90 having internal threads 91 is screwed onto the finish thread(s) to attach the collar 90 to the neck finish 18. Optionally, the collar can also be glued to the neck finish. A valve cup closure 70 is then placed on top of the collar; the valve cup includes a rounded sealing rim 73, which is crimped (deformed) at outer wall 75A of trough 74 (as shown in FIG. 7B) for attachment to a top portion 92 of the collar 90. Again, the valve assembly fits into central aperture 78 of wall 77 and may be attached by crimping (deforming) the inner closure wall 75B (as shown in FIG. 7B) to engage the valve stem assembly.

Figure 8:
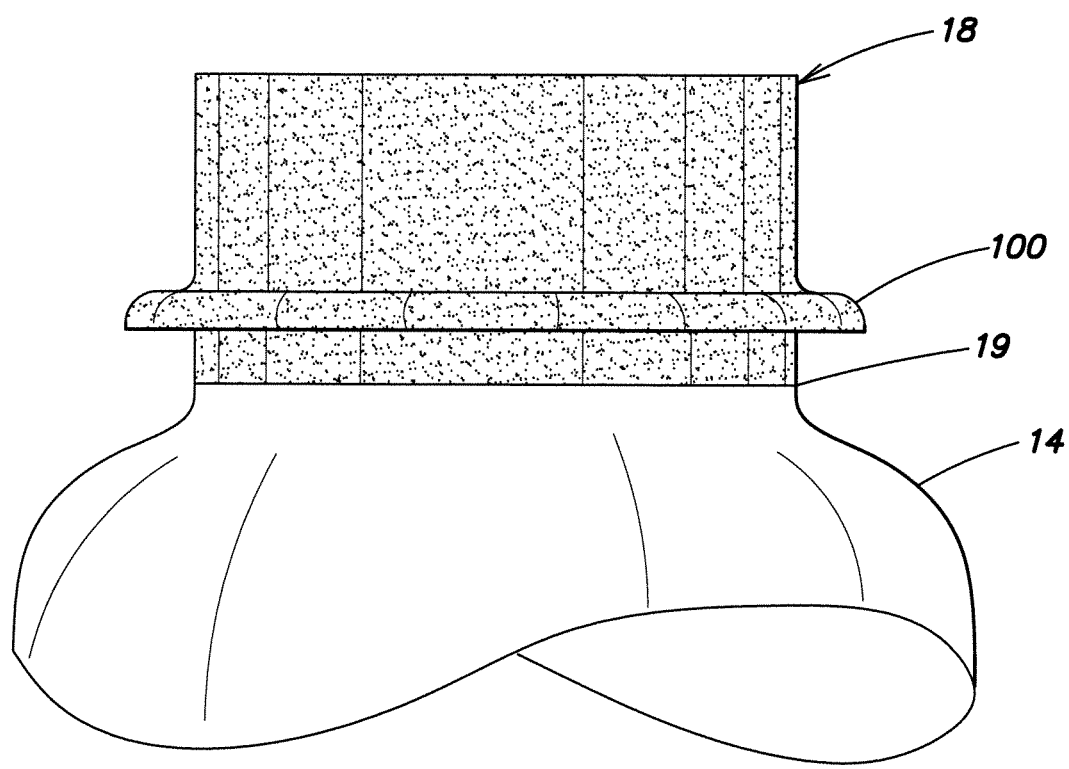
FIG. 8 is a schematic illustration of an alternative embodiment of a neck finish with a transfer bead.

FIG. 8 shows another embodiment of an upper crystallized portion 16 and partial shoulder 14. In this embodiment, a transfer bead 100 is provided toward the lower end of the neck finish 18. The transfer bead 100 is used to carry the preform 44 through the reheat blow molding machine. Preferably, the pull point 19 is 2-4 mm below the transfer bead 100.

The term "plastic" will be understood herein to encompass a thermoplastic crystallizable polymer. Although PET is used throughout the disclosure as an example, other polymers include other polyesters such as polyethylene napthalate (PEN), polyamide (Nylon), and copolymers, mixtures or blends thereof.

Blow molding techniques are well known in the art, and the plastic aerosol container can be formed by any known blow molding technique. Plastic aerosol containers may be made by a stretch blow molding process (also called orientation blow molding). For example, in a stretch blow molding process, the plastic is first molded into a preform using the injection molding process. Typically, preforms are packaged, and fed later (after cooling) into a reheat stretch blow molding machine. A preform is produced with a neck which includes a finish of the container on one end, which may have a transfer bead that is used to carry the preform through the heating process. In the stretch blow molding process, the preforms are heated (typically using infrared heaters) above their glass transition temperature Tg, then blown (using high pressure air) into hollow containers in a metal blow mold. Usually, the preform is stretched with a core rod as part of the process. The expansion of some polymers, for example, PET (polyethylene terephthalate) results in strain hardening of the resin. This allows the containers to better resist deformation when used to contain a pressurized product.

The crystallized finish allows the blow molder to more thoroughly heat the lower preform area (especially right below the neck finish) prior to blow molding, because one need not avoid all heating of the preform neck finish as would be required with an amorphous finish. An amorphous finish will soften if heated and then distort in the blow molding process, which produces one or more problems of: 1) nonuniform expansion of the lower preform portion in the blow mold; 2) inability to eject the distorted finish from the blow mold and/or 3) inability to seal with a closure (e.g. a threaded closure).

Thus, by allowing heating of the thermally crystallized neck finish area of the preform, the present invention greatly enhances the ability of the lower preform body area to uniformly expand because the crystalline region will not stretch and will provide a much sharper transition at the pull point.

While it may be more convenient and beneficial in one embodiment to thermally crystallize the entire finish, both throughout the finish thickness and throughout the finish height, in other embodiments it may be sufficient to preferentially thermally crystallize only select portions of the neck finish (in addition to the area of the neck finish immediately adjacent the pull point which must be crystallized). Thus, in one embodiment the top sealing portion where the closure is attached, and the lower neck finish (e.g. below the transfer bead) are crystallized, while other portions of the neck finish are not.

Although several preferred embodiments of the invention have been specifically illustrated and described herein, it is to be understood that variations may be made in the preform and container construction, materials, and method of forming the same without departing from the scope of the invention as defined by the appended claims.

The invention claimed is:

1. A plastic aerosol container comprising:
a thermally crystallized neck finish configured to receive an aerosol valve and closure assembly, the aerosol valve and closure assembly including a crimp or thread configured to seal the valve and closure assembly to the neck finish;
an expanded biaxially strain oriented aerosol container body, integral with the neck finish, including a thermally uncrystallized and biaxially strain oriented shoulder and sidewall;
a junction between the thermally crystallized neck finish and the shoulder defining a pull point at which biaxial strain orientation of the container body begins, wherein the pull point is a line of demarcation between the thermally crystallized neck finish and the biaxially strain oriented shoulder; and
wherein the thermally crystallized neck finish and the junction defining the pull point at which biaxial strain orientation began provide a structural integrity resisting deformation such that the plastic aerosol container with an aerosol valve and closure assembly sealed to the neck finish can withstand a hot water bath test comprising:
the plastic aerosol container is filled with 60% water and 40% nitrogen pressurized to 130 psig, sealed and submerged in a hot water bath of 153 deg. F. for 30 minutes and shows no leakage at the closure and no signs of distortion.

2. The aerosol container set forth in claim 1, wherein the container comprises at least one of polyester and polyamide.

3. The aerosol container set forth in claim 1, wherein the container comprises polyethylene terephthalate (PET).

4. The aerosol container set forth in claim 1, wherein the neck finish includes at least one of a flange and a thread.

5. The aerosol container set forth in claim 1, further comprising an aerosol valve and closure assembly including a crimp configured to connect the valve and closure assembly to the neck finish.

6. The aerosol container set forth in claim 1, further comprising an aerosol valve and closure assembly including a thread configured to connect the valve and closure assembly to the neck finish.

7. The aerosol container set forth in claim 1, wherein the shoulder has a smallest diameter at the pull point equal to a diameter of the neck finish.

8. A method of making a plastic aerosol container from a preform of crystallizable polymer, the preform comprising:
an upper preform portion and a lower preform portion,
the upper preform portion including a neck finish configured to receive an aerosol valve and closure assembly;
the lower preform portion including a tapered shoulder configured to be expanded by blow molding to form an expanded biaxially strain oriented shoulder of an aerosol container body;
the lower preform portion further including a sidewall configured to be expanded by blow molding to form an expanded biaxially strain oriented sidewall of the aerosol container body;
the method comprising steps of:
creating a pull point at which biaxial strain orientation begins below the neck finish of the preform by thermally crystallizing the preform neck finish while the lower preform portion including the tapered preform shoulder and sidewall remain thermally uncrystallized;
blow molding the lower portion of the preform from the pull point to form an expanded biaxially strain oriented container shoulder, formed from the thermally uncrystallized tapered preform shoulder, and an expanded biaxially strain oriented container sidewall, formed from the thermally uncrystallized preform sidewall, wherein the Dull point is a line of demarcation between the thermally crystallized neck finish and the biaxially strain oriented shoulder of the container body; and wherein the thermally crystallized neck finish and the junction defining the pull point at which biaxial strain orientation began provide a structural integrity resisting deformation such that the plastic aerosol container, with an aerosol valve and closure assembly having a crimp or thread configured to seal the valve and closure assembly to the neck finish, can withstand a hot water bath test wherein the container is filled with 60% water and 40% nitrogen pressurized to 130 psig and submerged in a hot water bath of 153 deg. F. for 30 minutes and shows no leakage at the closure and no signs of distortion.

9. The method set forth in claim 8, wherein the container comprises at least one of polyester and polyamide.

10. The method set forth in claim 8, wherein the container comprises polyethylene terephthalate (PET).

11. The method set forth in claim 8, wherein the neck finish includes at least one of a flange and a thread.

12. The method set forth in claim 8 further comprising: crimping an aerosol valve and closure assembly onto the neck finish.

13. The method set forth in claim 8 further comprising: threading an aerosol valve and closure assembly onto the neck finish.

14. The method set forth in claim 8, wherein the tapered preform shoulder is of increased thickness moving toward the preform sidewall.

15. The aerosol container set forth in claim 8, wherein the shoulder has a smallest diameter at the pull point equal to a diameter of the neck finish.

16. A preform for blow molding a plastic aerosol container comprising:
an upper preform portion and a lower preform portion,
the upper preform portion being thermally crystallized and including a thermally crystallized neck finish configured to receive an aerosol valve and closure assembly, the aerosol valve and closure assembly including a crimp or thread configured to seal the valve and closure assembly to the neck finish;
the lower preform portion not being thermally crystallized and including a thermally uncrystallized tapered shoulder configured to be expanded by blow molding to form an expanded biaxially strain oriented shoulder of an aerosol container body;
the lower preform portion further including a thermally uncrystallized sidewall configured to be expanded by blow molding to form an expanded biaxially strain oriented sidewall of the aerosol container body;
a junction between the thermally crystallized upper preform portion and the shoulder of the lower preform portion defining a pull point at which the biaxial strain orientation begins, wherein the pull point is a line of demarcation between the thermally crystallized neck finish and the biaxially strain oriented shoulder of the container body; and
wherein the thermally crystallized neck finish and the junction defining the pull point at which biaxial strain orientation began provide a structural integrity resisting deformation such that the plastic aerosol container and an aerosol valve and closure assembly sealed to the neck finish can withstand a hot water bath test wherein the plastic aerosol container is filled with 60% water and 40% nitrogen pressurized to 130 psig and submerged in a hot water bath of 153 deg. F. for 30 minutes and shows no leakage at the closure and no signs of distortion.

17. The preform set forth in claim 16, wherein the preform comprises at least one of polyester and polyamide.

18. The preform set forth in claim 16, wherein the preform comprises polyethylene terephthalate (PET).

19. The preform set forth in claim 16, wherein the neck finish includes at least one of a flange and a thread.

\* \* \* \* \*